United States Patent [19]

DeJeney

[11] Patent Number: 4,498,745
[45] Date of Patent: Feb. 12, 1985

[54] DEVICE TO CORRECT THE MALFUNCTION IN FILM FEED OF A PERFORATED FILM THROUGH A LIGHT BEAM

[76] Inventor: Viktor DeJeney, 6323 64th St., Riverdale, Md. 20737

[21] Appl. No.: 497,120

[22] Filed: May 23, 1983

Related U.S. Application Data

[63] Continuation-in-part of Ser. No. 292,702, Aug. 13, 1983, abandoned.

[51] Int. Cl.³ .............................................. G03B 41/04
[52] U.S. Cl. ...................................... 352/119; 352/14
[58] Field of Search ................ 352/119, 14, 166, 113, 352/105; 242/203

[56] References Cited

U.S. PATENT DOCUMENTS

| | | | |
|---|---|---|---|
| 1,910,995 | 5/1933 | Leventhal | 352/119 |
| 2,013,350 | 9/1935 | Leventhal | 352/119 |
| 2,107,039 | 2/1938 | Leventhal et al. | 352/119 |
| 4,312,576 | 1/1982 | DeJeney | 352/119 |

Primary Examiner—Monroe H. Hayes
Attorney, Agent, or Firm—James J. Brown

[57] ABSTRACT

A compact, easily installable light detector unit is provided to automatically correct malfunction in film feed in projection devices of the type described in U.S. Pat. No. 4,312,576. Light is projected through the perforation apertures in the film and conducted to light sensing a element by means of a fiber optic pipe. The mechanism which corrects malfunctions in film feed is activated only when such correction is required.

8 Claims, 7 Drawing Figures

U.S. Patent  Feb. 12, 1985  4,498,745
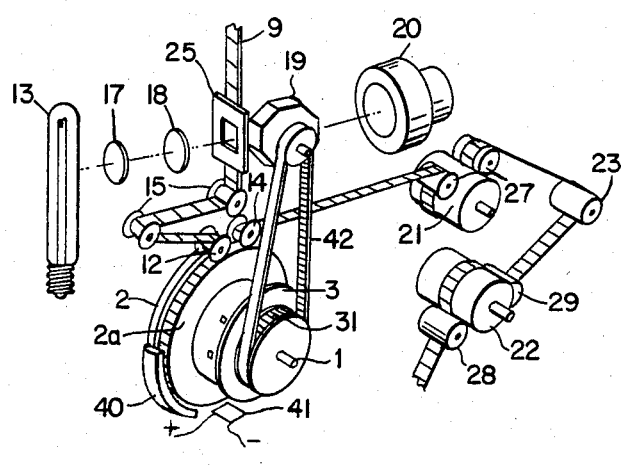

DEVICE TO CORRECT THE MALFUNCTION IN FILM FEED OF A PERFORATED FILM THROUGH A LIGHT BEAM

STATEMENT OF THE INVENTION

This application is a continuation-in-part of application Ser. No. 292,702 filed Aug. 13, 1983, entitled "Device to Control the Motion of Perforated Film through a Light Beam," now abandoned.

The present invention relates to a device which corrects malfunctions of film feed by means of a light beam which is projected through the perforation apertures of the film.

BACKGROUND OF THE INVENTION

Several attempts have been made in the prior art to control the motion of a film in moving picture projectors by means of a light beam. The principle of these inventions of the prior art has been to convert the speed of the film into an electric current by passing the film apertures between a light source and a light sensitive element and use the fluctuating electric current created in the light sensitive element to drive a variable speed electric motor which adjusts the speed of an optical compensator with the speed of the film.

However, to be able to pass the film between the light source and the light sensitive element one has to be placed inside and the other outside a hollow roller. Consequently one side of the roller has had to be left open and the various shafts of the roller had to protrude from the other side, concentrically which caused difficulties in the construction and prevented the design of a simple and easily installable device.

Another disadvantage of the system of the prior art was because the electric motor had to adjust continuously the speed of the film in relation to the speed of the compensator, the motor had to work all the time. Further, because there is always a certain backlash in the speed of a motor, the adjustment could not be perfect.

One object of the present invention is to provide a simple, compact, relatively small, easily installable light detector roller unit which automatically corrects malfunctions in film feed in an apparatus of the type described in U.S. Pat. No. 4,312,576 which describes a device for driving the film in projectors without using the teeth of the sprocket. According to the present invention correction of film feed is accomplished by detecting the occasional malfunction in film feed by means of a light beam projected through the perforation apertures of the film and the apertures of the film support means. This is achieved by the use of fiber optic light guiding pipes between the light source and the light sensitive element so that both can be placed in a stationary position exterior of the roller unit thereby making possible the compact and simple construction of the device.

Another object of the invention is to provide a device where the film feed is essentially perfect and the correction mechanism functions only when failure in film feed occurs.

BRIEF DESCRIPTION OF DRAWINGS

FIG. 1, is a diagrammatic representation of the installation of the light detector roller unit as installed in the invention of U.S. Pat. No. 4,312,576.

FIG. 2, is a perspective view of the light detector roller unit.

FIG. 3, is a side elevational view of the roller unit.

FIG. 4, is a cross section of the roller unit through line 46 of FIG. 5.

FIG. 5, is a cross section of the roller unit through line 45a of FIG. 4.

FIG. 6 is a diagrammatic view of the amplification.

FIG. 7 shows an alternative mounting of rotating shaft of the roller unit.

SUMMARY OF THE INVENTION

In accordance with the present invention a light detector roller unit with a circumference which is an integral multiple of the height of one picture section of the film is placed in the path of the film between the projection window and the first driving roller of an apparatus as described in U.S. Pat. No. 4,312,578. The device described in U.S. Pat. No. 4,312,578 drives the film with a steady and uniform motion. The present invention detects occasional malfunctions in film feed which may occur in the device of the patented invention and automatically corrects them. The roller unit of the invention consists of four parts: (1) a hollow film supporting surface, as wide as the film; (2) an adjacent hollow cylinder twice as wide as the film; (3) a sprocket, for a timing belt connection to the optical compensator; and (4) a metal disc mounted on a rotating shaft, on which the entire unit rotates.

Exterior of the roller unit a light source, a light sensor and an eddy current break is placed, all of which are stationary.

The film support surface is divided around the middle in two parts, perpendicular to the axes of rotation. Under normal conditions the two sections rotate together as one unit on the rotating shaft which is driven by the film, however they are able to rotate independently from each other in case of malfunction, in order to correct such failures. The portion of the film support surface on the opposite side of the perforation apertures is somewhat wider than the other and has a side wall, through which the rotating shaft protrudes and a mantle which provides the wider part of the film support surface. The other part of the film support surface has only a mantle and is tightly connected to the mantle of the adjacent cylinder.

In order to facilitate consideration of the function of the device, the terminology describing the different parts of the device are first discussed: The wider half of the film support surface which is on the opposite side from the perforation apertures is called the film driven disc. The other part of the film support surface which is on the same side as the perforation apertures is called the detector disc. Both discs and the adjacent cylinder are hollow and on the inside of the side wall of the film driven disc, two planetary gears are mounted, connected on one side to a sun gear which is tightly connected to the rotating shaft and on the other side to an inner gear ring which is tightly connected to the inside periphery of the detector disc. When the shaft is rotating, the two discs, the cylinder, the sprocket and the gears rotate as one unit. When the shaft is restricted from rotation the two planetary gears are forced to rotate through the sun gear and in turn they force the detector disc to rotate faster relative to the film driven disc.

The rotating shaft rotates in two ball bearing rings which are mounted stationary or around another stationary shaft mounted inside the rotating shaft. The driving surface of the film driven disc is treated with neoprene to prevent slippage. This disc will always rotate together with the film. The detector disc is connected through the adjacent cylinder, the sprocket, and the timing belt to a prism and always rotates together with the prism. Consequently, during operation when the relation between the film and the detector is correct, the relation between the film and the prism is also under control.

To detect occasional malfunctions in film feed, the detector disc has a first series of apertures corresponding with the perforation apertures of the film. The adjacent cylinder between the detector disc and the sprocket has a second corresponding series of apertures, apart from the first one.

From the apertures on the detector disc, flexible fiber optic light guiding pipe conduct the light through the hollow cylinder to the second series of apertures on the mantle of the cylinder, where the light is detected by a stationary silicon or photocell light detector, exterior of the roller unit. When in operation under normal conditions the perforation apertures of the film follow closely the apertures of the detector disc, so that the opaque part of the disc blocks the light from passing through the perforation apertures.

When slippage occurs, because the slippage can occur only in the direction of the linear speed of the film, the perforation apertures will slip over the apertures of the detector disc, thereby allowing the light beam to pass through the perforation apertures and the apertures of the detector disc and be conducted through the light guiding fiber optic pipes to the second series of apertures to activate the silicon or photocell light detector and create an electric impulse. A stationary exterior light source provides the light projected through the perforation apertures and the light guiding fiber optic pipes to activate the light detector photocell. The light source can, for example, be the projector lamp itself with the light being conducted through a wider fiber optic guiding pipe to the apertures of the detector disc.

From the photocell the electric impulse is amplified and conducted to an eddy current or magnetic break which stops the shaft of the roller unit from rotation, thereby forcing by means of the planetary gears the detector disc to rotate faster in the direction of the speed of the film relative to the speed of the film driven disc and the film, re-establishing thereby the normal operation conditions.

More detailed explanation will be apparent from the drawings and specification.

Referring to FIG. 1, light detector roller unit, consisting of film driven disc 2 detector disc 2a cylinder 3 sprocket 31 and metal disc 36 is installed in the apparatus of the invention described in U.S. Pat. No. 4,312,578 and of which here only some parts are shown. These parts are: projection lamp 13, consensor lenses 17 and 18, drum 23, guide rollers 12, 14, and 15. The installed light detector roller unit is driven by film 9.

Referring to FIG. 2, film 9 is wound around the film supporting surface of the roller unit which is cut in two parts, disc 2 and disc 2a, all rotate together as one unit on shaft 1.

Light source 40 and light detector 41 are placed exterior of the roller unit and are stationary.

Referring to FIG. 3, shaft 1 rotates freely in ball bearings 30a and 30f. Film driven disc 2 and detector disc 2a, are separated at line 43. Apertures 4 and 5 are on the driving surface of detector disc 2a. Apertures 4a, 5a, 6a, 7a, and 8a are disposed on the mantle of cylinder 3. Sprocket 31 connects detector disc 2a with prism 19 through timing belt 42. Metal disc 36 rotates together in tight connection with shaft 1. Eddy current break 43a controls the metal disc and is exterior and stationary.

Referring to FIG. 4, shaft 1 rotates freely in ball bearings 30a and 30f. When shaft 1 is not rotating the light detector roller unit rotates on shaft 1 in ball bearings 30b, 30c, and 30d.

Sun gear 39 and metal disc 36 are tightly connected to shaft 1. Planetary gears 37 and 38 are mounted through shafts 37a and 38a on the side wall of film driven disc 2. Inner gear ring 59 is mounted on the inner periphery of detector disc 2a and is connected to planetary gears 37 and 38. Light guiding fiber optic pipes 4, 5, 6, 7, and 8 are connected to the apertures on the driving surface of detector disc 2a and conduct the light to the other end of the pipe on mantle of cylinder 3. Light source 40 and light detector 41 are placed exterior of the roller unit and are stationary.

Eddy current break 43 controls the rotation of the shaft 1 through metal disc 36, exterior of the roller unit and is stationary.

Referring to FIG. 5, film 9 is wound around film supporting surface 47. Light pipes 4, 5, 6, 7, 8, 10, 11, and 12 connect the apertures on the detector disc with the apertures on the mantle of the cylinder 3. Light source 40 provides the light which is projected through the perforation apertures 9a, 9b, and 9d. Planetary gears 37 and 38 are connected on one side to sun gear 39 on the other side to inner gear ring 59 which is on the inner periphery of detector disc 2a. Guide rollers 12 and 14 keep the film tight on driving surface 47 of the roller unit.

Referring to FIG. 6, the light detector silicon or photocell 90 is activated by the light passing through the perforation apertures and the light guiding pipes. The electric impulse which is produced is conducted through conductor 92 and through power amplifier 58 to eddy currant break 97. Capacitor 96 resistors 94 and 95 provide gain stabilization, DC sources 93, 98 provide the electric energy.

Referring to FIG. 7, as an alternative mounting of the rotating shaft, shaft 1 rotates freely on stationary shaft 99 rather than directly in ball bearings.

In the embodiment of the invention, as shown as an example in FIGS. 1, 2, 3, 4, and 5 the roller unit installed in the apparatus described in my earlier patent is driven by film 9 through the driving surface of film driven disc 2 and 2a. Film 9 is driven by the driving mechanism of my previously mentioned patent through the shafts of the reels and the driving rollers 21 and 22 shown in FIG. 1 with adequate speed.

Driven by the film, detector disc 2a and film driven disc 2 will always rotate together, however, the detector disc 2a can be forced to rotate faster relative to the film driven disc through the planetary gears 37 and 38 (which are mounted on the side wall of the film driven disc) and the sun gear 39, by retarding the rotation of the shaft through metal disc 36 and eddy current break or electromagnet 43a. If film 9 slips on the surface of detector disc 2a, the slippage can occur only in the direction of the linear motion of the film, consequently, when the detector disc 2a is forced to move faster than the film driven disc 2, the slippage is corrected.

To detect the slippage, apertures are placed on the detector disc 22a, corresponding with the perforation apertures of the film.

In the embodiment shown here, the circumference of the driving surface of the two discs 2 and 2a is 24 times the height of one picture section of the film and the apertures on the detector disc (in FIG. 5) 4, 5, 6, 7, 8, 10, 11, and 12 are at a distance from each other which is three times the height of one picture section of the film. Consequently, there are 8 apertures on the detector disc 2a. The apertures 6 and 7, in FIG. 5 with the connected fiber optic light pipes are below the perforation apertures 9a and 9d in position where the opaque part of detector disc 2a blocks the light beam from passing through the perforation apertures.

Film 9 in FIG. 5 moves in counter clockwise direction and drives film driven disc 2 and detector disc 2a in the same direction so the slippage can occur only in counter clockwise direction. Consequently, if slippage occurs, the perforation apertures 9a and 9d (FIG. 5) will slip over the apertures 6 and 7 of the detector disc allowing thereby the light beam to pass through the fiber optic light guiding pipes and be conducted to the apertures on the mantle of the cylinder 3 where it is detected by the light detector 41 shown in FIGS. 1, 2, 3, and 4 and creates an electric impulse.

The electric impulse is amplified as shown in FIG. 6 and conducted to eddy current break 43a, which if activated, stops metal disc 36 from rotation; and, because disc 36 is in tight connection with shaft 1 and so in tight connection with gear 39, gears 37 and 38 will start rotating around shafts 37a and 38a pushing thereby through inner gear ring 59 detector disc 2a forward with a faster speed relative to film driven disc 2 and the apertures 6 and 7 will be forced back again in the position where they were before the slippage occurred and the opaque part of the detector disc 2a will block again the light beam from passing through the perforation apertures, re-establishing in this way the normal operating condition.

In case of film shrinkage or faulty splicing the same procedure is repeated and the failure corrected.

Keeping the relationship between the film and the prism always the same, the synchronization is accomplished through the sprocket and timing belt between the detector disc and the prism.

In the illustrated embodiment the detector disc is 24 times the height of one picture section and the prism has 8 faces, consequently, the ratio between the sprocket of the prism and the sprocket of the roller unit has to be 1:3. This means that the prism has to rotate 3 times faster than the roller unit.

The length of the film strip between the projection window and the light detector apertures must be a multiple integral of the height of one picture section of the film, to be able to keep the picture on the screen in the right place, This problem has been taken care of in the aforementioned patent by manually moving back and forth roller 15 in FIG. 1.

I have shown here one embodiment of the invention, but it is obvious that many variations can be made without departing from the spirit of the invention.

What is claimed is:

1. A device for correcting malfunctions of film feed in non-intermittent type motion picture projectors where said film is provided with regularly spaced transparent apertures, comprising: a hollow rotating cylinder turning on a rotatable shaft, the mantle of said cylinder being bisected transverse to the axis of rotation to form a first cylinder with a wall on one side and a mantle to engage the film and provide part of the support means for said film and a second cylinder, the mantle of which is also engaged with the film strip, providing the other part of said film support means, both being mounted to rotate on the same rotating shaft to turn independently of one another but adapted to be driven together by said film strip, an adjacent third hollow cylinder tightly connected on one side to said second cylinder, and on the other side connected to a sprocket drive means to turn with optical compensator means in synchronization with said film strip, an electrical brake means, comprising a metal disc tightly connected to said rotating shaft and a stationary electromagnet mounted exterior to the rotating cylinder and cooperating with said metal disc to release or restrain said shaft from turning said film support surface of said second cylinder; said second cylinder surface being provided with a first series of spaced circumferentially disposed apertures in a distance from each other which is the integral multiple of the height of one picture section adapted to align and correspond with the apertures in the film strip for receiving light impulses from an external light source through said film apertures and the apertures of said second cylinder in case of malfunction in film feed each of said apertures being provided with conduit means for conducting the light it receives to one of a corresponding second set of apertures in said third cylinder, said second cylinder being further provided with an internal gear-ring means mounted therein to engage gear means on said rotatable shaft for turning said second cylindrical surface independently of said first cylindrical surface, stationary light detector means being disposed external to said third cylinder to receive light sequentially from each of said second set of apertures and to produce an electric impulse in case of malfunction of film feed, means being further provided for amplifying and transmitting said electrical current to said electrical brake means for restraining or releasing rotation of said rotatable shaft.

2. The device of claim 1 wherein said means for conducting light are fiber optic light guiding pipes.

3. The device of claim 1 wherein said cylindrical film transport means are turned by said film strip.

4. The device of claim 1 wherein said third cylinder, the sprocket and the optical compensator are driven by said film strip.

5. The device of claim 1 wherein said electrical brake means is a stationary eddy current brake or a solenoid exterior of the rotating cylinders which controls rotation of a metal disc mounted tightly on said rotatable shaft transverse thereto releasing or restraining rotation thereof.

6. The device of claim 1 wherein said stationary light source and said stationary photocell both being arranged exterior of said rotating components.

7. The device of claim 1 wherein said internal gear means comprises a sun gear mounted tightly on said rotatable shaft to engage, and turn with a plurality of planet gears which in turn are engaged and turn with an inner ring gear mounted on the inner periphery of said second cylinder.

8. The device of claim 1 wherein the second cylinder and the third cylinder are tightly connected having remote series of apertures, corresponding with each other connected through light guiding fiber optic pipes.

* * * * *